(12) United States Patent
Hole

(10) Patent No.: US 8,483,688 B2
(45) Date of Patent: Jul. 9, 2013

(54) METHODS AND APPARATUS TO PROCESS SIGNAL STRENGTHS OF NOT ALLOWED CELLS DURING CELL RESELECTION

(75) Inventor: David Philip Hole, Southampton (GB)

(73) Assignee: Research In Motion Limited, Waterloo (CA)

( * ) Notice: Subject to any disclaimer, the term of this patent is extended or adjusted under 35 U.S.C. 154(b) by 480 days.

(21) Appl. No.: 12/773,586

(22) Filed: May 4, 2010

(65) Prior Publication Data
US 2010/0279693 A1 Nov. 4, 2010

Related U.S. Application Data

(60) Provisional application No. 61/175,346, filed on May 4, 2009.

(51) Int. Cl.
*H04W 36/00* (2009.01)

(52) U.S. Cl.
USPC ........... 455/436; 455/437; 455/438; 455/443; 455/444; 370/328; 370/329; 370/330; 370/331; 370/332

(58) Field of Classification Search
USPC .......................... 455/436–444; 370/328–332
See application file for complete search history.

(56) References Cited

U.S. PATENT DOCUMENTS

| | | | | |
|---|---|---|---|---|
| 6,434,389 | B1 * | 8/2002 | Meskanen et al. | 455/437 |
| 8,121,602 | B2 * | 2/2012 | Yi et al. | 455/436 |
| 8,249,591 | B2 * | 8/2012 | Tod et al. | 455/434 |
| 2008/0227453 | A1 * | 9/2008 | Somasundaram et al. | 455/436 |
| 2009/0088160 | A1 * | 4/2009 | Pani et al. | 455/436 |
| 2009/0181676 | A1 * | 7/2009 | Lee et al. | 455/436 |
| 2009/0245176 | A1 * | 10/2009 | Balasubramanian et al. | 370/328 |
| 2010/0035615 | A1 * | 2/2010 | Kitazoe et al. | 455/436 |
| 2010/0074235 | A1 * | 3/2010 | Sebire et al. | 370/338 |

FOREIGN PATENT DOCUMENTS

| | | |
|---|---|---|
| WO | 2008060236 | 5/2008 |
| WO | 2008081315 | 7/2008 |
| WO | 2008112255 | 9/2008 |

OTHER PUBLICATIONS

3rd Generation Partnership Project, "3GPP TS 44.060 Technical Specification," Version 8.4.0, Feb. 2009, 589 pages.
3rd Generation Partnership Project, "3GPP TS 45.008 Technical Specification," Version 8.2.0, Feb. 2009, 137 pages.
International Preliminary Examining Authority, "International Preliminary Report on Patentability," issued in connection with corresponding Patent Application No. PCT/EP2010/002729, on Sep. 15, 2011 (16 pages).
3GPP TSG GERAN #42, "Reselection to Cells when "Not Allowed Cells" are Within Range," Agenda item 7.1.5.8, 7.2.5.2.3, Research in Motion UK Ltd., Shenzhen, China, May 2009 (2 pages).
3GPP TSG GERAN Meeting #42, "Change Request: Best Cell Reselection Criteria for Inter-RAT Reselection to E-UTRAN, (Version 45.008, CR 0388, Current Version: 8.2.0)," Research in Motion UK Ltd., Shenzhen, China, May 2009 (3 pages).
International Searching Authority/EP, "International Search Report," issued in connection with International Application No. PCT/EP2010/002729, mailed on Aug. 27, 2010, (4 pages).
International Searching Authority/EP, "Written Opinion" issued in connection with International Application No. PCT/EP2010/002729, mailed on Aug. 27, 2010, (8 pages).
3rd Generation Partnership Project, "3GPP TS 36.304; Technical Specification Group Radio Access Network; Evolved Universal Terrestrial Radio Access (E-UTRA); User Equipment (UE) procedures in idle mode (Release 8)," Version 8.5.0, Mar. 2009, (30 pages).
EPO, "Communication under Rule 71 (3) EPC," issued in connection with European Patent Application No. 10721111.2, dated Feb. 28, 2013 (6 pages).

* cited by examiner

*Primary Examiner* — Olumide T Ajibade Akonai
(74) *Attorney, Agent, or Firm* — Hanley, Flight & Zimmerman, LLC

(57) ABSTRACT

Methods and apparatus to process signal strengths of not allowed cells during cell reselection are disclosed. An example cell reselection method disclosed herein comprises obtaining cell information indicating whether signal strength of a first neighbor cell not allowed for cell reselection is to be considered during cell reselection, and reselecting to a second neighbor cell different from the first neighbor cell based on the cell information.

18 Claims, 7 Drawing Sheets

METHODS AND APPARATUS TO PROCESS SIGNAL STRENGTHS OF NOT ALLOWED CELLS DURING CELL RESELECTION

RELATED APPLICATION

This patent claims priority from U.S. Provisional Application Ser. No. 61/175,346, entitled "Methods and Apparatus to Process Signal Strengths of Not Allowed Cells during Cell Reselection" and filed on May 4, 2009. U.S. Provisional Application Ser. No. 61/175,346 is hereby incorporated by reference in its entirety.

FIELD OF THE DISCLOSURE

This disclosure relates generally to cell reselection techniques and, more particularly, to methods and apparatus to process signal strengths of not allowed cells during cell reselection.

BACKGROUND

Cell reselection commonly refers to a procedure allowing a mobile station in a mobile communication system to switch from communicating with its current cell to communicating with a neighbor cell, for example, while the mobile station is operating in an idle mode. Many mobile communication systems employ one or more neighbor cell lists to specify which neighbor cells the mobile station can consider for cell reselection. For example, neighbor cell lists relating to cells of some mobile communication systems, such as a third generation partnership project (3GPP) system compliant with the global system for mobile communications (GSM) standards, the enhanced data rates for GSM evolution (EDGE) standards, the universal mobile telecommunication system (UMTS) standards, or any combination thereof, utilize allowed cell lists (also referred to as whitelists) that are signaled to the mobile station and specify those neighbor cells to which cell reselection is allowed, with cell reselection to any unspecified neighbor cell generally not being allowed. Neighbor cell lists relating to other example mobile communication systems, such as a system compliant with the 3GPP evolved universal terrestrial radio access network (E-UTRAN) standards, utilize not allowed cell lists (also referred to as blacklists) that are signaled to the mobile station and specify those neighbor cells to which cell reselection is not allowed, with cell reselection to any unspecified cell generally being allowed.

Additionally, one or more cell reselection metrics are typically evaluated by the mobile station to determine whether to remain in communication with the current cell or to reselect to a particular candidate neighbor cell. Signal strength is one such metric. For example, 3GPP systems may require that, to reselect to an E-UTRAN candidate cell (such as during reselection from a cell implementing a GSM/EDGE radio access network (GERAN) to an E-UTRAN closed subscriber group (CSG) cell), the candidate E-UTRAN cell must have the best signal strength for the particular frequency. Such a requirement is commonly referred to as a "best on frequency" criterion. Accordingly, a mobile station may need to process both neighbor cell lists and signal strength metrics during cell reselection.

DETAILED DESCRIPTION

Figure 1:
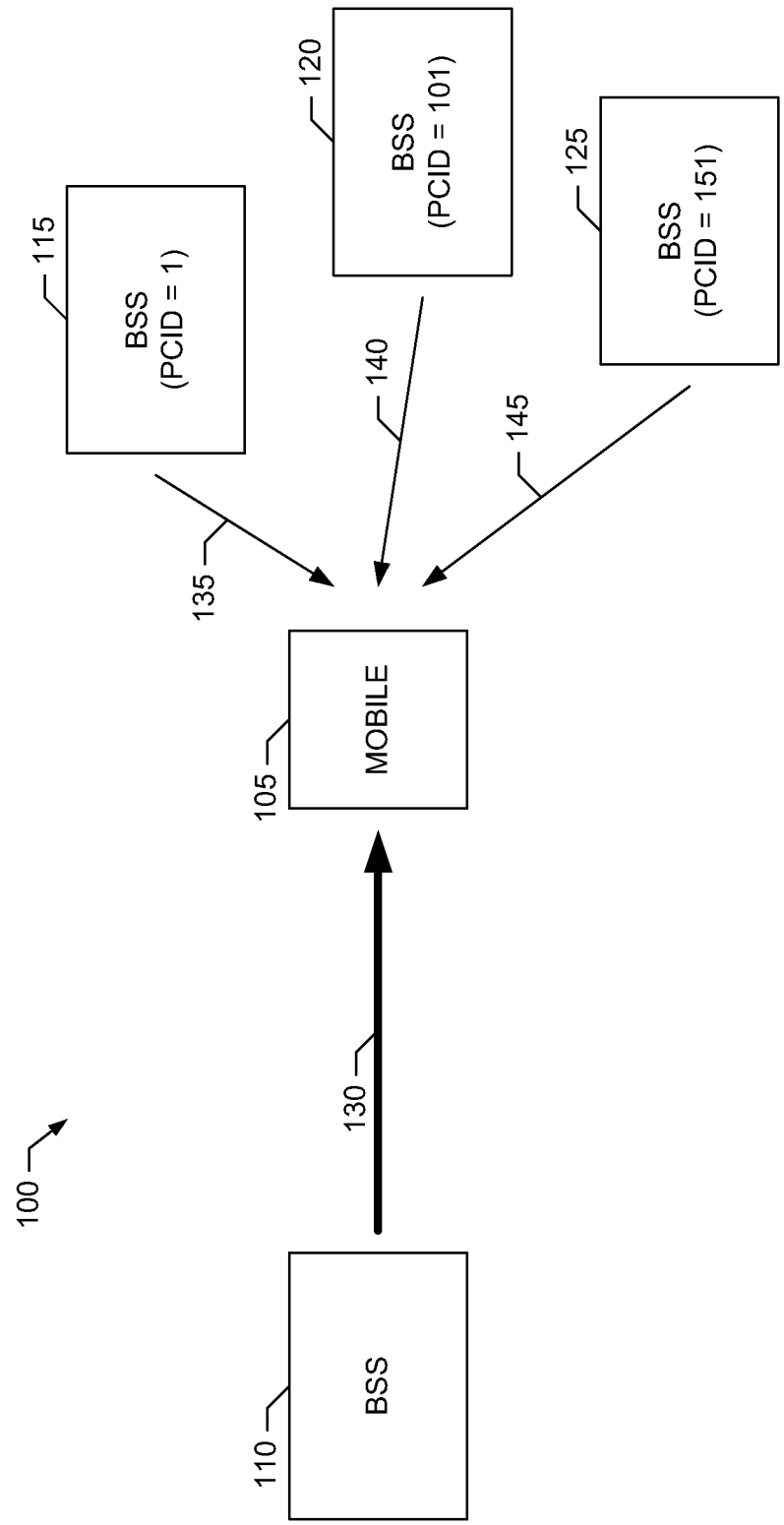
FIG. 1 is a block diagram of an example 3GPP communication system capable of supporting the methods and apparatus described herein.

Methods and apparatus to process signal strengths of not allowed cells during cell reselection are disclosed herein. An example cell reselection technique described herein involves obtaining not allowed cell information (e.g., also referred to as blacklist information) indicating whether a first neighbor cell is not allowed (e.g., blacklisted) for cell reselection. When the first neighbor cell is not allowed for cell reselection, the example technique also involves reselecting to a second neighbor cell when at least one of the following conditions is valid: (1) a first signal strength of the first neighbor cell does not exceed a second signal strength of the second neighbor cell, or (2) the not allowed cell information further indicates that the first signal strength of the first neighbor cell is not to be considered (e.g., can be ignored) during cell reselection. For example, when the first neighbor cell is not allowed for cell reselection, the example technique may involve reselecting to the second neighbor cell even though the first signal strength of the first neighbor cell exceeds the second signal strength of the second neighbor cell if the not allowed cell information further indicates that the first signal strength of the first neighbor cell is not to be considered during cell reselection.

When the not allowed cell information further indicates that the first signal strength of the first neighbor cell is not to be considered during cell reselection, at least some implementations of the preceding example cell reselection technique further prohibit reselection to the second neighbor cell when a third signal strength of a third neighbor cell exceeds the second signal strength of the second neighbor cell. For example, reselection to the second neighbor cell may be prohibited in such an example when the not allowed cell information indicates that the third neighbor cell is not allowed for cell reselection, and the not allowed cell information further indicates that the third signal strength of the third neighbor cell is to be considered during cell reselection.

As described in greater detail below, a particular example implementation of the preceding cell reselection techniques can be realized in a mobile station for use in a 3GPP communications network. In such an example implementation, the neighbor cells correspond to E-UTRAN cells. Furthermore, the mobile station in such an example may obtain the not allowed (e.g., blacklisted) cell information by decoding the not allowed information from broadcast signaling (e.g., such as point-to-multipoint or point-to-point signaling conveying common messages/information to some or all of the mobile stations in a coverage area) or dedicated signaling (e.g., point-to-point signaling conveying specific messages/information to a specific target mobile station, such as a packet measurement order message) received from a current cell serving the mobile station. The current cell may correspond to any type of cell, such as a GERAN cell, a UTRAN cell, an E-UTRAN cell, etc. In an example implementation, the not allowed information may be conveyed as one or more data structures listing the neighbor cells of the current cell that are not allowed for cell reselection (e.g., such as a subset of neighbor cells not allowed for cell reselection specified from the universe of possible neighbor cells). As described in greater detail below, such data structures can also include indicators to specify whether the signal strength of a certain not allowed cell is or is not to be considered during cell reselection. Additionally, various signal strength metrics, such as signal strengths based on received signal code power (RSCP), reference symbol received power (RSRP), etc., or any combination thereof, can be supported by the example cell reselection methods and apparatus described herein.

As described in greater detail below, the example methods and apparatus described herein can provide substantial benefits over existing cell reselection techniques. For example, as mentioned above, mobile stations in many mobile communication systems evaluate signal strength metrics and associated cell reselection criteria, such as a best on frequency criterion, to determine whether to reselect to a particular candidate neighbor cell. Additionally, such mobile stations may be required to process not allowed cell information (e.g., blacklist information) specifying certain cells to which reselection is not allowed. However, existing systems utilizing such not allowed cell information fail to address how the signal strength of a not allowed cell is to be considered when evaluating the cell reselection criteria, such as the best on frequency criterion.

In contrast, the example methods and apparatus described herein provide a flexible framework for determining how the signal strength of a not allowed cell is to be considered when performing cell reselection. For example, the example methods and apparatus described herein enable a network operator to specify that the signal strength of a first not allowed cell is to be considered during cell reselection. Additionally or alternatively, the example methods and apparatus described herein enable the network operator to specify that the signal strength of a second not allowed cell need not be considered during cell reselection. Furthermore, the example methods and apparatus described herein enable the network operator to specify combinations in which the signal strengths of one or more not allowed cells are to be considered during cell reselection, while the signal strengths of one or more other not allowed cells can be ignored. In other words, the example methods and apparatus described herein enable a network operator to expressly specify conditions when a mobile station is not allowed to reselect to a candidate cell that is weaker than a not allowed cell (e.g., to avoid contributing to the interference experienced by the not allowed cell), as well as conditions when a mobile station is allowed to reselect to a candidate cell that is weaker than a not allowed cell (e.g., such as when additional interference at the not allowed cell is not a concern of the network operator).

Turning to the figures, a block diagram of an example 3GPP communication system 100 capable of supporting the cell reselection techniques described herein is illustrated in FIG. 1. The communication system 100 includes an example mobile station 105 served by an example current cell 110 implemented by a first base station subsystem (BSS), which can include a first base transceiver station (BTS) and a first base station controller (BSC). Additionally, the communication system 100 includes example cells 115, 120 and 125, which are neighbor cells of the current cell 110. The neighbor cells 115, 120 and 125 are implemented by one or more BSSs different from the BSS implementing the current cell 110. As described in greater detail below, the mobile station 105 and the current cell 110 are capable of implementing the example methods and apparatus described herein to process signal strengths of not allowed cells to determine whether cell reselection to one of the neighbor cells 115, 120 or 125 is permitted or prohibited.

In the communication system 100, the mobile station 105 may correspond to any type of mobile station or user endpoint equipment, such as a mobile telephone device, a fixed telephone device, a personal digital assistant (PDA), etc. Each of the cells 110-125 may correspond to any type of cell, such as a GERAN cell, a UTRAN cell, an E-UTRAN cell, etc. Moreover, some or all of the cells 110-125 may be the same or different types of cells. For example, each of the neighbor cells 115, 120 and 125 may be an E-UTRAN cell, whereas the current cell 110 may be a GERAN cell, a UTRAN cell, an E-UTRAN cell, etc., or even a non-3GPP cell, such as a cell compliant with a code division multiple access (CDMA) standard, etc. Also, although each of the cells 110-125 is depicted as being implemented by a separate BSS, some or all of the cells 115-125 may be implemented by a common BSS. Furthermore, although only one mobile station 105 and four (4) cells 110-125 are illustrated in FIG. 1, the communication system 100 can support any number of mobile stations 105 and cells 110-125.

In the illustrated example of FIG. 1, the mobile station 105 is operating in an idle mode (or any other mode in which cell reselection is permitted, such as GERAN packet transfer mode) and monitoring one or more downlink signals 130 transmitted by the mobile station's current cell 110. For example, the mobile station 105 monitors the downlink signal(s) 130 to receive broadcast signaling (e.g., point-to-multipoint or point-to-point signaling used to send common messages/information) transmitted to some or all of the mobile stations being served by the current cell 110. Additionally, the mobile station 105 monitors the downlink signal(s) 130 to receive dedicated signaling (e.g., point-to-point signaling to a specific target mobile station) being transmitted from the current cell 110 to only the mobile station 105. Furthermore, the mobile station 105 monitors the downlink signal(s) 130 to evaluate the signal strength of the current cell 105 (e.g., from the perspective of the mobile station 105). As such, the downlink signal(s) 130 are represented by a thick directional line in FIG. 1 to indicate that the mobile station 105 is being served by (or, in other words, is camped on) the current cell 110.

In the illustrated example of FIG. 1, the mobile station 105 is also able to monitor one or more downlink signals 135 transmitted by the neighbor cell 115, one or more downlink signals 140 transmitted by the neighbor cell 120 and one or more downlink signals 145 transmitted by neighbor cell 125. For example, the mobile station 105 is able to monitor the downlink signals 135, 140 and 145 to evaluate the respective signal strengths of the neighbor cells 115, 120 and 125 (e.g., from the perspective of the mobile station 105). However, because the mobile station 105 is not yet being served by any of the neighbor cells 115, 120 and 125, the downlink signal(s) 135, 140 and 145 are represented by respective thin directional lines in FIG. 1.

In the communication system 100, the cells 110-125 are each identified by a center operating frequency and a physical layer cell identity (designated as PCID or PCI herein). In an example implementation, a PCID is an integer, such as a value in the range 0 to 507. For example, the neighbor cell 115 is depicted as having a PCID of 1, the neighbor cell 120 is depicted as having a PCID of 101 and the neighbor cell 125 is depicted as having a PCID of 151. For ease of description, and without loss of generality, the neighbor cells 115, 120 and 125 are assumed to be associated with the same center operating frequency (although the current cell 110 may be associated with the same or a different center operating frequency).

The communication system 100, and the mobile station 105 in particular, utilizes not allowed cell information (e.g., blacklist information) to specify which neighbor cells are allowed for cell reselection. Thus, in the illustrated example, the current cell 110 provides not allowed cell information to the mobile station 105 to indicate which of the neighbor cells 115, 120 and 125, if any, are not allowed for cell reselection. As described in greater detail below, such not allowed cell information may be signaled by the current cell 110 to the mobile station 105 via broadcast signaling, dedicated signaling or any combination thereof. Also, as described in greater detail below, such not allowed cell information also includes indications specifying whether the signal strengths of the not allowed cells are to be considered during cell reselection, can be ignored during cell reselection, or a combination thereof.

The not allowed cell information signaled by the current cell 110 to the mobile station 105 allows a network operator to tailor cell reselection criteria to various operating scenarios in a manner not supported conventionally. For example, in a border scenario, a home mobile network operator may specify that neighbor cells belonging to a different operator (e.g., located near a border between operating regions) are not allowed cells. In other words, the home mobile network operator may want the mobile station 105 to reselect to neighbor cells belonging to the home operator regardless of whether there may be stronger (e.g., closer) neighbor cells belonging to a different operator. In such a border scenario, the home operator may use the example methods and apparatus described herein to specify that the signal strengths of such not allowed border cells need not be considered (e.g., can be ignored) during cell reselection.

In another example corresponding to a home operating scenario, the home mobile network operator may specify that certain neighbor cells belonging to the home operator itself are to be blocked, or not allowed, for some or all users. For example, the home mobile network operator may block a particular cell for maintenance and testing. As another example, a home mobile network operator may block a particular cell for users in general, but allow access to certain premium users. In such home operating scenarios, the home mobile network operator may want the mobile station 105 to consider the signal strength of the not allowed home cells to prevent the mobile station 105 from reselecting to an allowed neighbor cell that is weaker than a not allowed neighbor cell. In other words, the home operator may want the mobile station 105 to reselect to a neighbor cell only if it is the strongest cell among both the allowed cells and the not allowed cells (or at least those not allowed cells whose signal strength is to be considered during cell reselection). Reselection to a weaker neighbor cell can be undesirable because the mobile station 105 may need to increase its transmit power to communicate with the weaker cell, thereby introducing excessive interference to the stronger, not allowed cell. The home operator may use the example methods and apparatus described herein to specify that the signal strengths of such not allowed home cells need to be considered (e.g., cannot be ignored) during cell reselection.

The example methods and apparatus described herein also support scenarios in which the signal strengths of some neighbor cells need not be considered (e.g., can be ignored) during cell reselection, whereas the signal strengths for other neighbor cells are to be considered (e.g., cannot be ignored) during cell reselection. With this in mind, in the illustrated examples that follow, the neighbor cell 115 having a PCID of 1 is assumed to correspond to a not allowed home cell for which signal strength is to be considered during cell reselection. Additionally, in the illustrated examples that follow, the neighbor cell 120 having a PCID of 101 is assumed to correspond to a not allowed border cell for which signal strength need not be considered during cell reselection. Furthermore, the neighbor cell 125 having a PCID of 151 is assumed to correspond to an allowed cell. Thus, as described in greater detail below, the not allowed cell information signaled by the current cell 110 to the mobile station 105 indicates that the signal strength of the not allowed neighbor cell 115 is to be considered during cell reselection, whereas the signal strength of the not allowed neighbor cell 120 can be ignored during cell reselection. Accordingly, as demonstrated in greater detail below, even under a best on frequency criterion, the mobile station 105 can reselect to the neighbor cell 125 even when the signal strength of the neighbor cell 125 is lower than the signal strength of the neighbor cell 120. However, the mobile station 105 cannot reselect to the neighbor cell 125 when the signal strength of the neighbor cell 125 is lower than the signal strength of the neighbor cell 115.

Although the example methods and apparatus disclosed herein are described in the context of the example 3GPP communication system 100 of FIG. 1, these example methods and apparatus can be readily adapted for use in any communication system in which not allowed cell information (e.g., blacklist information) is utilized in cell reselection or any similar procedure.

Figure 2:
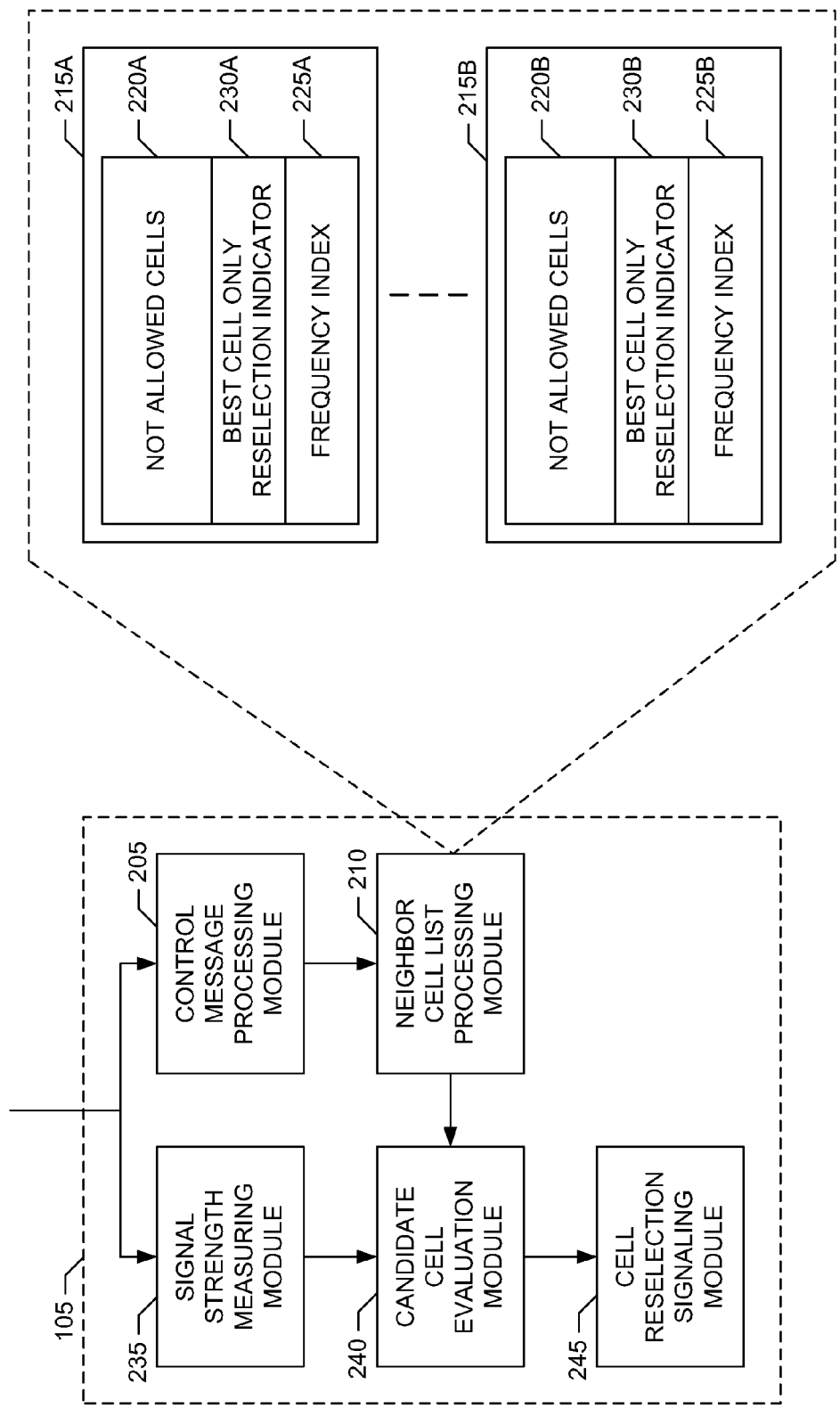
FIG. 2 illustrates an example mobile station and example not allowed cell information that may be used to implement the 3GPP communication system of FIG. 1.

An example implementation of the mobile station 105 of FIG. 1 is illustrated in FIG. 2. The example mobile station 105 of FIG. 2 includes an example control message processing module 205 to process control messages used to signal not allowed cell information from the mobile station's current cell (e.g., such as the current cell 110 of FIG. 1) to the mobile station 105. For example, the control message processing module 205 can be configured to receive and decode broadcast control messages used to signal not allowed cell information to the mobile station 105. Additionally or alternatively, the control message processing module 205 can be configured to receive and decode dedicated control messages, such as packet measurement order (PMO) messages in a 3GPP GERAN implementation, used to signal not allowed cell information to the mobile station 105.

The mobile station 105 of FIG. 2 also includes an example neighbor cell list processing module 210 to obtain the not allowed cell information received and decoded by the control message processing module 205. The neighbor cell list processing module 210 is configured to use the obtained not allowed cell information to update one or more neighbor cell lists used by the mobile station 105 for cell reselection. For example, the neighbor cell list processing module 210 of FIG. 2 obtains the cell information in the form of one or more not allowed cell structures 215A-B. Each not allowed cell structure 215A-B includes a respective not allowed cells field 220A-B and a respective center frequency index field 225A-B to identify the not allowed neighbor cells by PCID and center operating frequency. The not allowed cells field 220A-B can be configured to allow specification of individual PCIDs, ranges of PCIDs, or any combination thereof, to identify the not allowed neighbor cells. Although two cell information structures 215A-B are illustrated in FIG. 2, any number of cell information structures 215A-B can be supported by the example mobile station 105.

Additionally, each not allowed cell structure 215A-B includes a respective best cell only reselection indicator field 230A-B to indicate whether the signal strengths of the not allowed cells specified by the respective not allowed cells field 220A-B and center frequency index field 225A-B are to be considered when performing best on frequency cell reselection. For example, the best cell only reselection indicator field 230A-B can be set to a logic-1 to indicate that the signal strengths of the specified not allowed cells are to be considered during best on frequency cell reselection. Conversely, the best cell only reselection indicator field 230A-B can be set to a logic-0 to indicate that the signal strengths of the specified not allowed cells need not be considered during best on frequency cell reselection. Multiple not allowed cell structures 215A-B are supported in which, for example, the first not allowed cell structure 215A specifies not allowed cells whose signal strengths are to be considered during cell reselection, whereas the second not allowed cell structure 215B specifies not allowed cells whose signal strengths need not be considered during cell reselection.

The mobile station 105 of FIG. 2 further includes an example signal strength measuring module 235 to measure signal strengths of neighbor cells (as well as the current cell) for use in cell reselection. The signal strength measuring module 235 can be configured to evaluate any appropriate signal strength measurement appropriate for the type of neighbor cell being examined For example, the signal strength measuring module 235 can evaluate a received signal strength indicator (RSSI) metric, a received signal code power metric (RSCP), a reference symbol received power (RSRP), etc., or any combination thereof. Additionally, the example signal strength measuring module 235 associates the measured signal strength for a particular neighbor cell with that cell's PCID determined, for example, by decoding broadcast signaling being transmitted by the particular neighbor cell.

The mobile station 105 of FIG. 2 also includes an example candidate cell evaluation module 240 to evaluate the signal strength metrics determined by the signal strength measuring module 235 in accordance with the not allowed cell information obtained by the example neighbor cell list processing module 210. In the illustrated example, the candidate cell evaluation module 240 allows reselection to a candidate neighbor cell if it has the highest signal strength (e.g., is best on frequency) among the allowed neighbor cells and no not allowed cell to be considered during cell reselection (e.g., indicated via a best cell only reselection indicator 230A-B of logic-1) has a higher signal strength. In other words, the candidate cell evaluation module 240 allows reselection to a candidate neighbor cell if the candidate cell has the highest signal strength (e.g., is the best on frequency) among all allowed and not allowed cells whose signal strength is to be considered during cell reselection. As such, the candidate cell evaluation module 240 ignores the signal strength of any not allowed neighbor cell that is not to be considered during cell reselection (e.g., as indicated via a best cell only reselection indicator 230A-B of logic-0).

Figure 4:
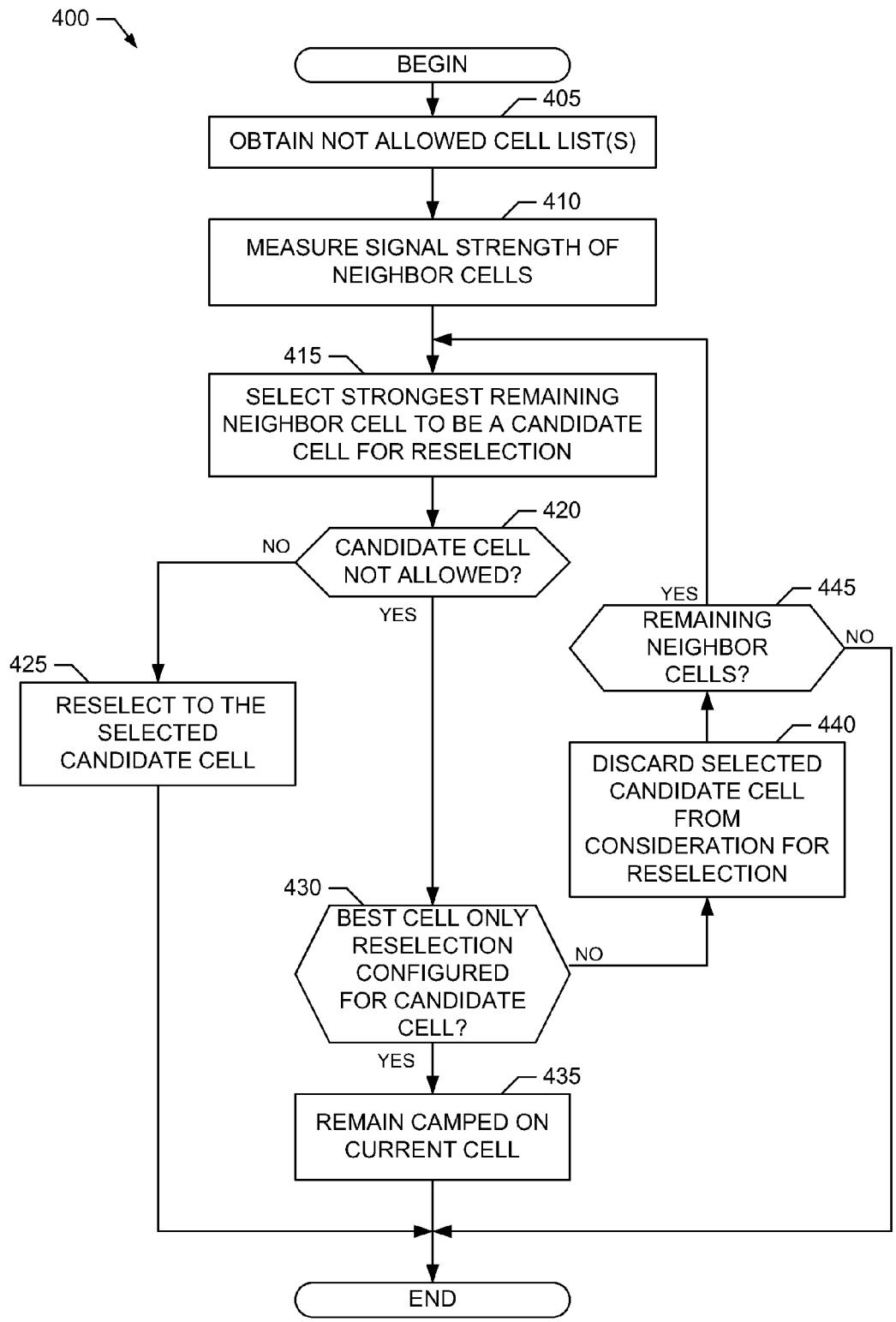
FIG. 4 is a flowchart representative of a first example process that may be performed to implement the mobile station of FIG. 2.
Figure 5:
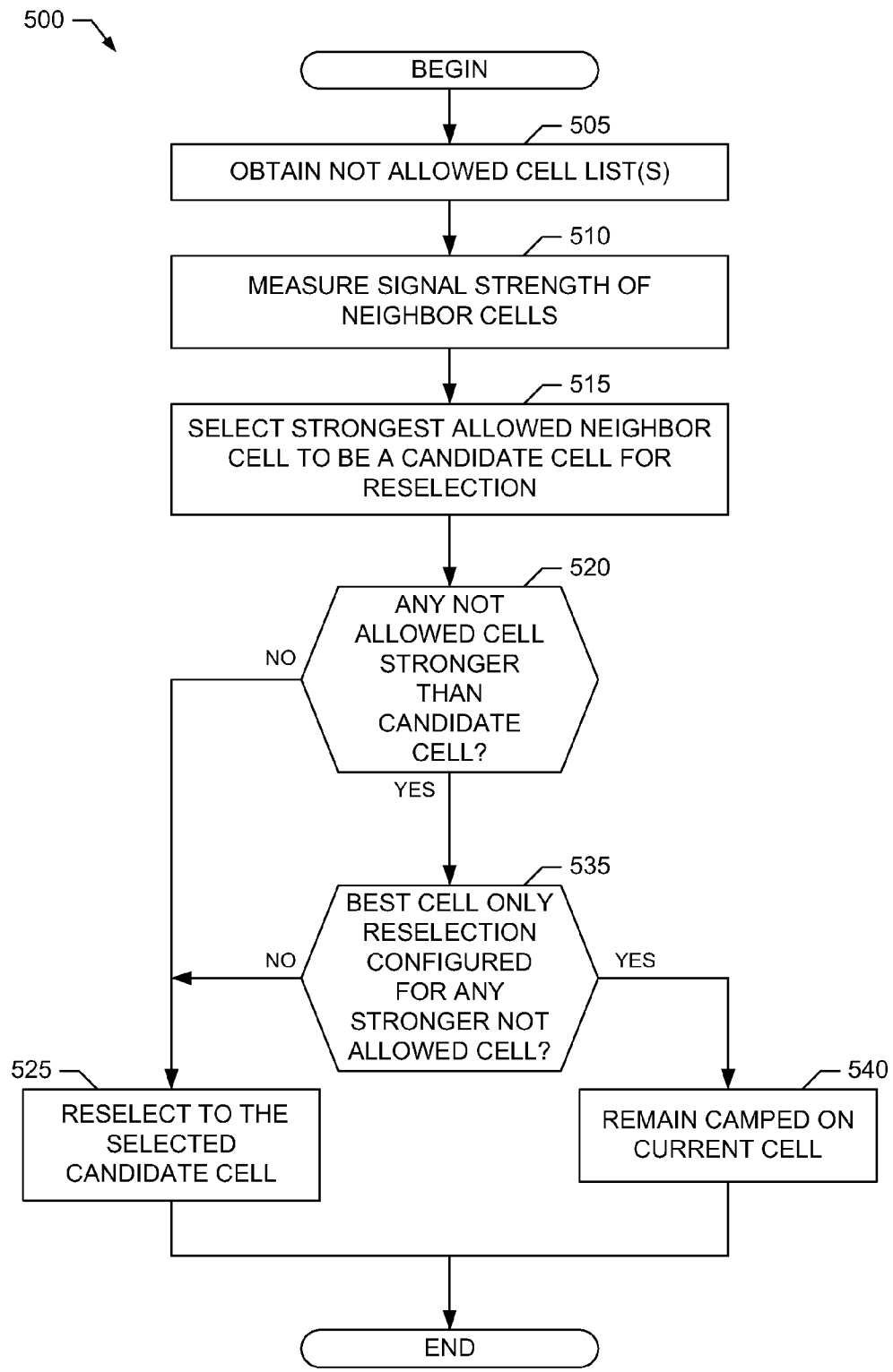
FIG. 5 is a flowchart representative of a second example process that may be performed to implement the mobile station of FIG. 2.

The mobile station 105 includes an example cell reselection signaling module 245 to reselect to a candidate cell identified by the candidate cell evaluation module 240. The example cell reselection signaling module 245 can implement any appropriate signaling and other procedures required by the mobile station 105 to stop being served by its current cell and start being served by the candidate neighbor cell. Example procedures that may be used to implement the mobile station 105 of FIG. 2 are illustrated in FIGS. 4-5 and discussed in greater detail below.

While an example manner of implementing the example mobile station 105 of FIG. 1 has been illustrated in FIG. 2, one or more of the elements, processes and/or devices illustrated in FIG. 2 may be combined, divided, re-arranged, omitted, eliminated and/or implemented in any other way. Further, the example control message processing module 205, the example neighbor cell list processing module 210, the example signal strength measuring module 235, the example candidate cell evaluation module 240, the example cell reselection signaling module 245 and/or, more generally, the example mobile station 105 of FIG. 2 may be implemented by hardware, software, firmware and/or any combination of hardware, software and/or firmware. Thus, for example, any of the example control message processing module 205, the example neighbor cell list processing module 210, the example signal strength measuring module 235, the example candidate cell evaluation module 240, the example cell reselection signaling module 245 and/or, more generally, the example mobile station 105 could be implemented by one or more circuit(s), programmable processor(s) executing software or firmware instructions, application specific integrated circuit(s) (ASIC(s)), programmable logic device(s) (PLD(s)) and/or field programmable logic device(s) (FPLD(s)), etc. When any of the appended claims are read to cover a purely software and/or firmware implementation, at least one of the example mobile station 105, the example control message processing module 205, the example neighbor cell list processing module 210, the example signal strength measuring module 235, the example candidate cell evaluation module 240 and/or the example cell reselection signaling module 245 are hereby expressly defined to include a tangible medium such as a memory, digital versatile disk (DVD), compact disk (CD), etc., storing such software and/or firmware. Further still, the example mobile station 105 of FIG. 2 may include one or more elements, processes and/or devices in addition to, or instead of, those illustrated in FIG. 2, and/or may include more than one of any or all of the illustrated elements, processes and devices.

Figure 3A:
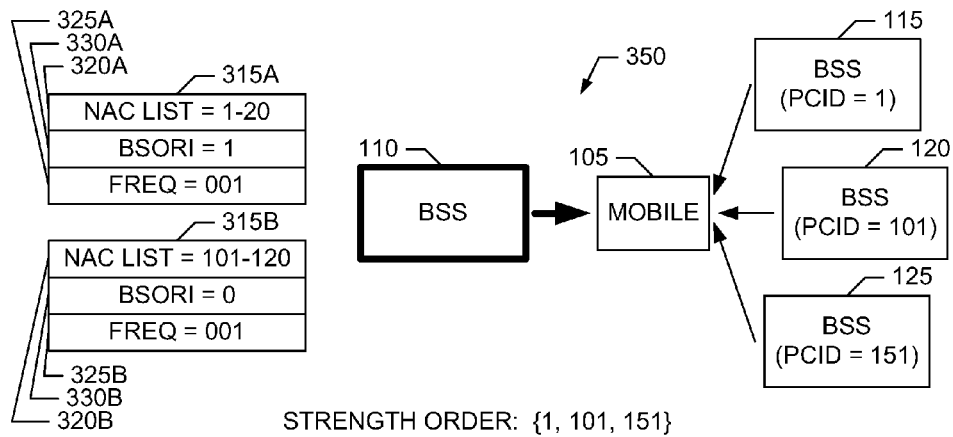
FIG. 3A-C collectively illustrate example operations of the mobile station of FIG. 2 to process signal strengths of neighbor cells in the 3GPP communication system of FIG. 1 using the not allowed cell information of FIG. 2.
Figure 3B:
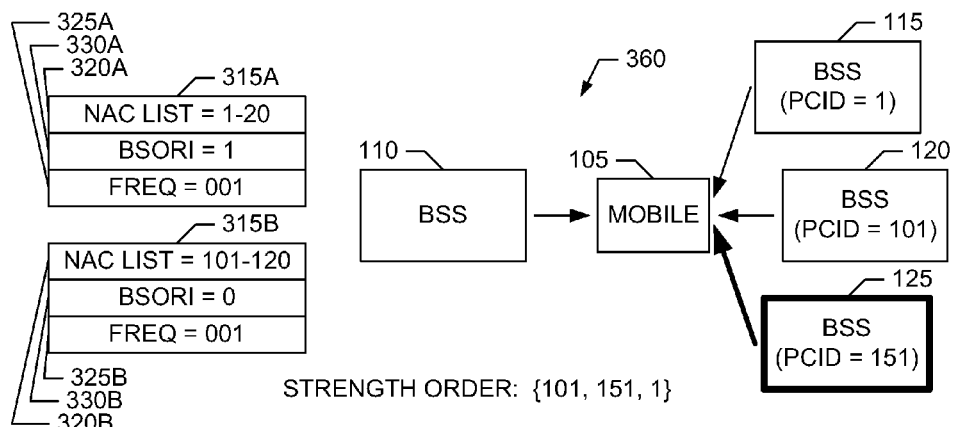
Figure 3C:
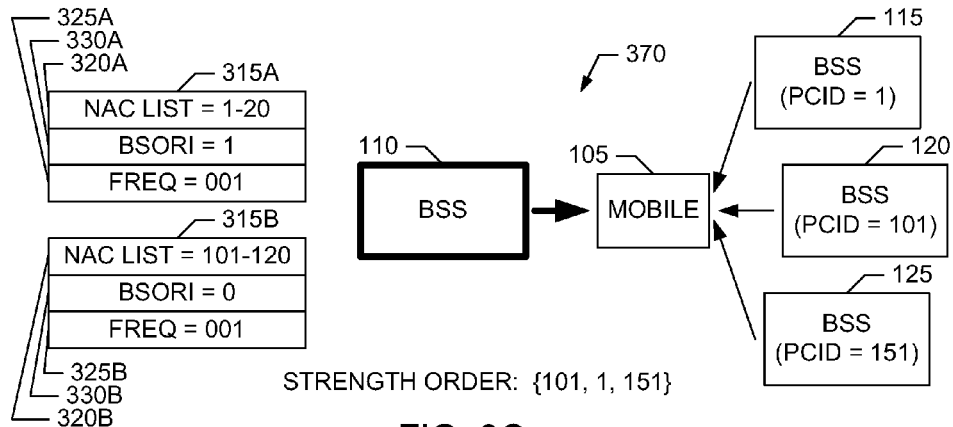

Three example cell reselection operations capable of being performed by the example mobile station 105 of FIG. 2 in the example communication system 100 of FIG. 1 are illustrated respectively in FIGS. 3A-C. All of the example cell reselection operation are based on the same not allowed cell information conveyed as two not allowed cell structure 315A-B, each including a respective not allowed cells field 320A-B, center frequency index fields 325A-B and best cell only reselection indicator field 330A-B. For ease of description, and without loss of generality, the center frequency index fields 325A-B specify that that identified not allowed cells all have a center frequency index of 001.

The not allowed cells field 320A in the first not allowed cell structure 315A specifies that any cell having a PCID in the range of 1 through 20 is not allowed. The best cell only reselection indicator field 330A in the first not allowed cell structure 315A further specifies that the signal strength of any not allowed cell having a PCID in the range of 1 through 20 is to be considered during cell reselection. Additionally, the not allowed cells field 320B in the second not allowed cell structure 315B specifies that any cell having a PCID in the range of 101 through 120 is not allowed. However, the best cell only reselection indicator field 330B in the second not allowed cell structure 315B further specifies that the signal strength of any not allowed cell having a PCID in the range of 101 through 120 need not be considered during cell reselection.

As illustrated in FIG. 3A, in a first example cell reselection operation 350, the mobile station 105 determines that the neighbor cell 115 having PCID=1 has the highest signal strength, followed by the neighbor cell 120 having PCID=101, with the neighbor cell 125 having PCID=151 exhibiting the lowest signal strength. Here, the mobile station 105 cannot reselect to the neighbor cell 125 having PCID=151, which is the only allowed cell, because the signal strength of the not allowed neighbor cell 115 having PCID=1 is higher and the first not allowed cell structure 315A specifies that the signal strength of this not allowed neighbor cell is to be considered during cell reselection. In other words, cell reselection to the allowed neighbor cell 125 having PCID=151 is prevented in the example cell reselection operation 350 because the signal strength of the allowed neighbor cell 125 having PCID=151 is not the strongest of all allowed and not allowed neighbor cells that are to be considered by the mobile station 105 during cell reselection. Therefore, the mobile station 105 remains associated with (e.g., camped on) the current cell 110 (which is represented in FIG. 3A as a thick line surrounding the current cell 110).

As illustrated in FIG. 3B, in a second example cell reselection operation 360, the mobile station 105 determines that the neighbor cell 120 having PCID=101 has the highest signal strength, followed by the neighbor cell 125 having PCID=151, with the neighbor cell 115 having PCID=1 exhibiting the lowest signal strength. Here, the mobile station 105 can reselect to the neighbor cell 125 having PCID=151, which is the only allowed cell, even though the not allowed neighbor cell 120 having PCID=101 has a higher strength. This is because the second not allowed cell structure 315B specifies that the signal strength of this not allowed neighbor cell need not be considered (e.g., can be ignored) during cell reselection. In other words, cell reselection to the allowed neighbor cell 125 having PCID=151 is permitted in the example cell reselection operation 360 because the signal strength of the allowed neighbor cell 125 having PCID=151 is the strongest of all allowed and not allowed neighbor cells that are to be considered by the mobile station 105 during cell reselection. Therefore, the mobile station 105 is able to reselect to the neighbor cell 125 (which is represented in FIG. 3B as a thick line surrounding the neighbor cell 125).

As illustrated in FIG. 3C, in a third example cell reselection operation 370, the mobile station 105 determines that the neighbor cell 120 having PCID=101 has the highest signal strength, followed by the neighbor cell 115 having PCID=1, with the neighbor cell 125 having PCID=151 exhibiting the lowest signal strength. Here, the mobile station 105 cannot reselect to the neighbor cell 125 having PCID=151, which is the only allowed cell, even though the neighbor cell 120 having the strongest signal strength can be ignored. This is because the signal strength of the not allowed neighbor cell 115 having PCID=1 is also higher than the signal strength of the allowed neighbor cell 125 having PCID=151, and the signal strength of the not allowed neighbor cell 115 is to be considered during cell reselection. In other words, cell reselection to the allowed neighbor cell 125 having PCID=151 is prevented in the example cell reselection operation 370 because the signal strength of the allowed neighbor cell 125 having PCID=151 is not the strongest of all allowed and not allowed neighbor cells that are to be considered by the mobile station 105 during cell reselection. Therefore, the mobile station 105 remains associated with (e.g., camped on) the current cell 110 (which is represented in FIG. 3C as a thick line surrounding the current cell 110).

FIGS. 3A-C depict three examples of the mobile station 105 processing signal strengths of not allowed neighbor cells to perform cell reselection. These examples are not intended to be exhaustive.

Figure 7:
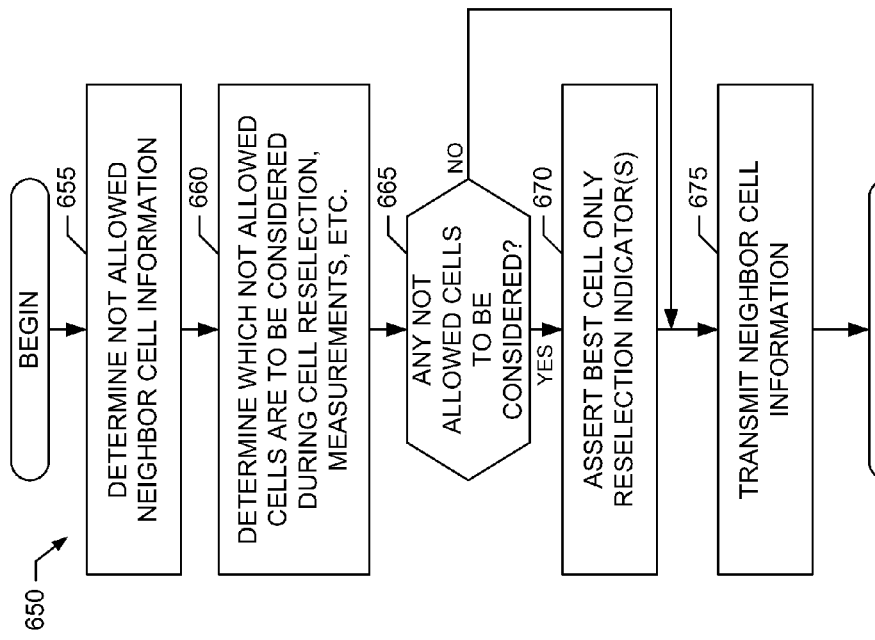
FIG. 7 a flowchart representative of an example process that may be performed to implement the base station subsystem of FIG. 6.
Figure 6:
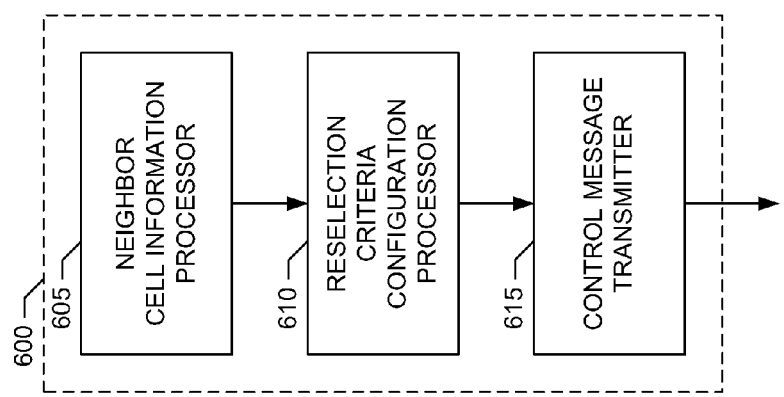
FIG. 6 illustrates an example base station subsystem that may be used to implement the 3GPP communication system of FIG. 1.

Flowcharts representative of example processes that may be executed to implement any, some or all of the example 3GPP communication system 100, the example mobile station 105, the example control message processing module 205, the example neighbor cell list processing module 210, the example signal strength measuring module 235, the example candidate cell evaluation module 240 and the example cell reselection signaling module 245, as well as the example BSS 600, the example neighbor cell information processor 605, the example reselection criteria configuration processor 610 and the example control message transmitter 615 of FIG. 6 and described in greater detail below, are shown in FIGS. 4-5 and 7.

In these examples, the process represented by each flowchart may be implemented by one or more programs comprising machine readable instructions for execution by: (a) a processor, such as the processor 712 shown in the example processing system 700 discussed below in connection with FIG. 8, (b) a controller, and/or (c) any other suitable device. The one or more programs may be embodied in software stored on a tangible medium such as, for example, a flash memory, a CD-ROM, a floppy disk, a hard drive, a DVD, or a memory associated with the processor 712, but the entire program or programs and/or portions thereof could alternatively be executed by a device other than the processor 712 and/or embodied in firmware or dedicated hardware (e.g., implemented by an application specific integrated circuit (ASIC), a programmable logic device (PLD), a field programmable logic device (FPLD), discrete logic, etc.). For example, any one, some or all of the example 3GPP communication system 100, the example mobile station 105, the example control message processing module 205, the example neighbor cell list processing module 210, the example signal strength measuring module 235, the example candidate cell evaluation module 240, the example cell reselection signaling module 245, the example BSS 600, the example neighbor cell information processor 605, the example reselection criteria configuration processor 610 and the example control message transmitter 615 could be implemented by any combination of software, hardware, and/or firmware. Also, any, some or all of the processes represented by the flowcharts of FIGS. 4-5 and 7 may be implemented manually.

Further, although the example processes are described with reference to the flowcharts illustrated in FIGS. 4-5 and 7, many other techniques for implementing the example methods and apparatus described herein may alternatively be used. For example, with reference to the flowcharts illustrated in FIGS. 4-5 and 7, the order of execution of the blocks may be changed, and/or some of the blocks described may be changed, eliminated, combined and/or subdivided into multiple blocks.

A first example process 400 that may be executed to implement cell reselection in the example mobile station 105 of FIG. 1 or 2, or both, is illustrated in FIG. 4. The process 400 may be executed at predetermined intervals (e.g., such as at specified neighbor cell measurement intervals), based on an occurrence of a predetermined event (e.g., such as detection of a new neighbor cell, detection of a low signal condition on a current cell, etc.), as a background process, etc., or any combination thereof. Additionally, the process 400 assumes that the neighbor cells being evaluated for cell reselection exist on the same center frequency. For scenarios in which neighbor cells exist on multiple center frequencies, the process 400 could be executed for each center frequency on which neighbor cells exist.

With reference to FIGS. 1 and 2, the process 400 of FIG. 4 begins execution at block 405 at which the neighbor cell list processing module 210 included in the mobile station 105 obtains one or more not allowed cell lists. For example, at block 405 the neighbor cell list processing module 210 obtains the not allowed cell list(s) in the form of one or more not allowed cell structures 215A-B decoded by the control message processing module 205 included in the mobile station 105 from any combination of received broadcast signaling, received dedicated signaling (e.g., such as received PMO messages), etc.

Next, control proceeds to block 410 at which the signal strength measuring module 235 included in the mobile station 105 measures the signal strengths of neighbor cells in range of the mobile station 105. For example, at block 410 the signal strength measuring module 235 can measure any combination of RSSI, RSCP, RSRP or other appropriate signal strength measurement for a particular neighbor cell. Additionally, at block 410 the signal strength measuring module 235 associates the measured signal strength for a particular neighbor cell with that cell's PCID determined, for example, by decoding broadcast signaling being transmitted by the particular neighbor cell.

Control then proceeds to block 415 at which the candidate cell evaluation module 240 included in the mobile station 105 selects the neighbor cell having the strongest measured signal strength to be a candidate cell for reselection. Then, at block 420 the candidate cell evaluation module 240 determines whether the candidate sell selected at block 415 is a not allowed cell as specified by the not allowed cell list(s) obtained at block 405. If the selected candidate cell is not a not allowed cell or, in other words, is an allowed cell (block 420), control proceeds to block 425. At block 425, the cell reselection signaling module 245 included in the mobile station 105 can implement any appropriate signaling and other procedures required by the mobile station 105 to stop being served by its current cell and start being served by the selected candidate neighbor cell. After processing at block 425 completes, execution of the example process 400 ends.

However, if the selected candidate cell is a not allowed cell (block 420), control proceeds to block 430 at which the candidate cell evaluation module 240 determines whether best cell only reselection is configured for the selected cell. For example, at block 430 the candidate cell evaluation module 240 determines whether a best cell only reselection indicator (e.g., such as one of the best cell only reselection indicator fields 230A-B) included in the not allowed cell list(s) obtained at block 405 specifies that the candidate cell selected at block 415 is to be considered during cell reselection. If the candidate cell evaluation module 240 determines that best cell only reselection is configured for the selected candidate cell and, thus, the candidate cell is to be considered during cell reselection (block 430), control proceeds to block 435. At block 435, the mobile station 105 foregoes reselection to the selected candidate cell and remains camped on its current cell. Execution of the example process 400 then ends.

If, however, the candidate cell evaluation module 240 determines that best cell only reselection is not configured for the selected candidate cell and, thus, the candidate cell need not be considered during cell reselection (block 430), control proceeds to block 440. At block 440, the candidate cell evaluation module 240 discards the selected cell from consideration for reselection. Control then proceeds to block 445 at which the candidate cell evaluation module 240 determines whether there are any remaining neighbor cells to evaluate for reselection. If there are no remaining neighbor cells to evaluate (block 445), execution of the example process 400 ends. Otherwise, control returns to block 415 and blocks subsequent thereto at which the candidate cell evaluation module 240 included in the mobile station 105 selects a remaining neighbor cell having the strongest measured signal strength to be a candidate cell for reselection and processes the selected candidate cell as described above.

A second example process 500 that may be executed to implement cell reselection in the example mobile station 105 of FIG. 1 or 2, or both, is illustrated in FIG. 5. The process 500 may be executed at predetermined intervals (e.g., such as at specified neighbor cell measurement intervals), based on an occurrence of a predetermined event (e.g., such as detection of a new neighbor cell, detection of a low signal condition on a current cell, etc.), as a background process, etc., or any combination thereof. Additionally, the process 500 assumes that the neighbor cells being evaluated for cell reselection exist on the same center frequency. For scenarios in which neighbor cells exist on multiple center frequencies, the process 500 could be executed for each center frequency on which neighbor cells exist.

With reference to FIGS. 1 and 2, the process 500 of FIG. 5 begins execution at block 505 at which the neighbor cell list processing module 210 included in the mobile station 105 obtains one or more not allowed cell lists. For example, at block 505 the neighbor cell list processing module 210 obtains the not allowed cell list(s) in the form of one or more not allowed cell structures 215A-B decoded by control message processing module 205 included in the mobile station 105 from any combination of received broadcast signaling, received dedicated signaling (e.g., such as received PMO messages), etc.

Next, control proceeds to block 510 at which the signal strength measuring module 235 included in the mobile station 105 measures the signal strengths of neighbor cells in range of the mobile station 105. For example, at block 510 the signal strength measuring module 235 can measure any combination of RSSI, RSCP, RSRP or other appropriate signal strength measurement for a particular neighbor cell. Additionally, at block 510 the signal strength measuring module 235 associates the measure signal strength for a particular neighbor cell with that cell's PCID determined, for example, by decoding broadcast signaling being transmitted by the particular neighbor cell.

Control then proceeds to block 515 at which the candidate cell evaluation module 240 included in the mobile station 105 selects a strongest allowed neighbor cell to be a candidate cell for reselection. Next, control proceeds to block 520 at which the candidate cell evaluation module 240 determines whether any not allowed neighbor cell has a higher signal strength than the candidate cell selected at block 515. If no other neighbor cell is stronger than the selected candidate cell or, in other words, the selected candidate cell is the strongest neighbor cell (block 520), control proceeds to block 525.

However, if any not allowed neighbor cell is stronger than the selected candidate cell (block 520), control proceeds to block 535 at which the candidate cell evaluation module 240 determines whether best cell only reselection is configured for any of the stronger not allowed neighbor cells. For example, at block 535 the candidate cell evaluation module 240 determines whether a best cell only reselection indicator (e.g., such as one of the best cell only reselection indicator fields 230A-B) included in the not allowed cell list(s) obtained at block 505 specifies that at least one of the stronger not allowed neighbor cells is to be considered during cell reselection.

If the candidate cell evaluation module 240 determines that best cell only reselection is not configured for any of the stronger not allowed neighbor cells and, thus, these stronger not allowed neighbor cells need not be considered during cell reselection (block 535), control proceeds to block 525. At block 525, the cell reselection signaling module 245 included in the mobile station 105 can implement any appropriate signaling and other procedures required by the mobile station 105 to stop being served by its current cell and start being served by the selected candidate neighbor cell. After processing at block 525 completes, execution of the example process 500 ends.

However, if the candidate cell evaluation module 240 determines that best cell only reselection is configured for at least one of the stronger not allowed neighbor cells and, thus, at least one stronger not allowed neighbor cell is to be considered during cell reselection (block 535), control proceeds to block 540. At block 540, the mobile station 105 foregoes reselection to the selected candidate cell and remains camped on its current cell. Execution of the example process 500 then ends.

An example BSS 600 that may be used to implement the current cell 110 of FIG. 1 is illustrated in FIG. 6. The example BSS 600 includes a neighbor cell information processor 605, an example reselection criteria configuration processor 610 and an example control message transmitter 615. In an example implementation, some or all of the neighbor cell information processor 605, the reselection criteria configuration processor 610 and the control message transmitter 615 could be implemented by a BSC included in the BSS 700. An example process 650 that may be executed to implement the BSS 600 and, in particular, the neighbor cell information processor 605, the reselection criteria configuration processor 610 and the control message transmitter 615 is illustrated in FIG. 7. The process 650 may be executed whenever the BSS 600 is to prepare and transmit neighbor cell information via broadcast signaling, dedicated signaling, or any combination thereof.

With reference to FIGS. 2 and 6, the process 650 of FIG. 7 begins execution at block 655 at which the neighbor cell information processor 605 included in the BSS 600 determines not allowed neighbor cell information that is to be conveyed via broadcast signaling, dedicated signaling, or any combination thereof. For example, at block 655 the neighbor cell information processor 605 determines the not allowed cell information, if any, to be included in the not allowed cells field 220A-B and the center frequency index field 225A-B of any cell information structure 215A-B to be transmitted via broadcast signaling, dedicated signaling, or any combination thereof.

Next, control proceeds to block 660 at which the reselection criteria configuration processor 610 included in the BSS 600 determines which not allowed cell(s) determined at block 605 is(are) to be considered during best on frequency cell reselection, measurement reporting, etc. For example, at block 660 the reselection criteria configuration processor 610 may obtain input information from a network operator specifying which not allowed cells are to be considered and which not allowed cells are not to be considered during best on frequency cell reselection, measurement reporting, etc. For example, as described above, the network operator may specify certain border neighbor cells owned by a different operator that are not allowed and whose signal strengths need not be considered during best on frequency cell reselection, measurement reporting, etc. Conversely, as described above, the network operator may specify certain neighbor cells owned by the network operator itself that are not allowed (e.g., blocked) for some or all users but whose signal strengths are still to be considered during best on frequency cell reselection, measurement reporting, etc.

Next, control proceeds to block 665 at which the reselection criteria configuration processor 610 determines whether any of the not allowed cells are to be considered during cell reselection, measurement reporting, etc. If any of the not allowed cells are to be considered (block 665), control proceeds to block 670 at which the reselection criteria configuration processor 610 asserts the best cell only reselection indicator field 230A-B in any not allowed cell structure 215A-B representing not allowed cells which are to be considered during best on frequency cell reselection, measurement reporting, etc.

Control then proceeds to block 675 at which the control message transmitter 615 included in the BSS 600 transmits neighbor cell information, including the determined not allowed cell structure(s) 215A-B, using an appropriate combination of broadcast and dedicated signaling. After processing at block 675 completes, execution of the example process 650 ends.

While an example manner of implementing the example BSS 600 has been illustrated in FIG. 6, one or more of the elements, processes and/or devices illustrated in FIG. 6 may be combined, divided, re-arranged, omitted, eliminated and/or implemented in any other way. Further, the example neighbor cell information processor 605, the example reselection criteria configuration processor 610, the example control message transmitter 615 and/or, more generally, the example BSS 600 of FIG. 6 may be implemented by hardware, software, firmware and/or any combination of hardware, software and/or firmware. Thus, for example, any of the example neighbor cell information processor 605, the example reselection criteria configuration processor 610, the example control message transmitter 615 and/or, more generally, the example BSS 600 could be implemented by one or more circuit(s), programmable processor(s) executing software or firmware instructions, application specific integrated circuit(s) (ASIC(s)), programmable logic device(s) (PLD(s)) and/or field programmable logic device(s) (FPLD(s)), etc. When any of the appended claims are read to cover a purely software and/or firmware implementation, at least one of the example BSS 600, the example neighbor cell information processor 605, the example reselection criteria configuration processor 610 and/or the example control message transmitter 615 are hereby expressly defined to include a tangible medium such as a memory, digital versatile disk (DVD), compact disk (CD), etc., storing such software and/or firmware. Further still, the example BSS 600 of FIG. 6 may include one or more elements, processes and/or devices in addition to, or instead of, those illustrated in FIG. 6, and/or may include more than one of any or all of the illustrated elements, processes and devices.

In the preceding cell reselection example methods and apparatus, not allowed cell information is described as being obtained via broadcast signaling, dedicated signaling (e.g., such as a PMO message), or both. However, in some example implementations, not allowed cell information can be determined by additionally or alternatively processing allowed cell information (e.g., also referred to as whitelist information) obtained via broadcast signaling, dedicated signaling (e.g., such as a PMO message), or both.

For example, the mobile station 105 could be configured to obtain allowed cell information (e.g., whitelist information) specifying neighbor cells allowed for reselection, as well as the not allowed cell information (e.g., blacklist information) described above that specifies which neighbor cells are not allowed for reselection and whether the signal strengths of such not allowed cells are still to be considered during cell reselection. Given both allowed cell and not allowed cell information, the mobile station 105 could be configured to measure the signal strengths of the cells specified in the allowed cell information and the cells specified in the not allowed cell information (or at least those not allowed cells that are to be considered during cell reselection). Processing of the measurement signal strengths of the allowed and not allowed cells would then proceed as described above. Alternatively, the mobile station 105 could be configured to ignore any not allowed cell information when any allowed cell information is present, effectively causing the allowed cell information to supersede the not allowed cell information.

As yet another example, the cell reselection techniques described herein can be implemented in the 3GPP communication system 100 of FIG. 1 upon adoption of the following example modifications to certain 3GPP standards (although adoption of the following standard modifications may not be required to implement the example cell reselection techniques described herein in a 3GPP system). For example, an example modification to 3GPP Technical Specification (TS) 45.008 (v8.2.0, February 2009) to support the cell reselection techniques described herein would be to add the following text to section 6.6.6: "The mobile station may reselect to a candidate E-UTRAN cell only if no other cell on the same frequency meets all of the following criteria: (1) the value of S_non-serving_XXX for that cell is higher than that of the candidate cell; (2) the cell is not allowed (i.e., is included in the Not Allowed Cells struct for that frequency, see 3GPP TS 44.018, 3GPP TS 44.060); (3) the BEST_CELL_ONLY_RESELECTION field associated with the Not Allowed Cell struct is set to '1' (see 3GPP TS 44.018, 3GPP TS 44.060). In other words, a mobile station shall not reselect to any E-UTRAN cell if there exists on the same frequency any stronger cell (i.e., where the value of S_non-serving_XXX is higher) which is not allowed and where the associated BEST_CELL_ONLY_RESELECTION field is set to '1' (see 3GPP TS 44.018, 3GPP TS 44.060)."

Additionally, an example modification to 3GPP TS 44.060 (v8.4.0, February 2009) to support the cell reselection techniques described herein would be to redefine the Not Allowed Cells structure specified therein as shown in Table 1.

TABLE 1

Example Not Allowed Cells Structure

<Repeated E-UTRAN Not Allowed Cells struct>::=
{0|1<NOT ALLOWED CELLS:<Not AllowedE-UTRAN Cells struct>>}
<BEST_CELL_ONLY_RESELECTION:bit(1)>
{1<E-UTRAN_FREQUENCY_INDEX:bit(3)>}**0;

3GPP TS 45.008 (v8.2.0, February 2009) and 3GPP TS 44.060 (v8.4.0, February 2009) are hereby incorporated by reference in their respective entireties.

Figure 8:
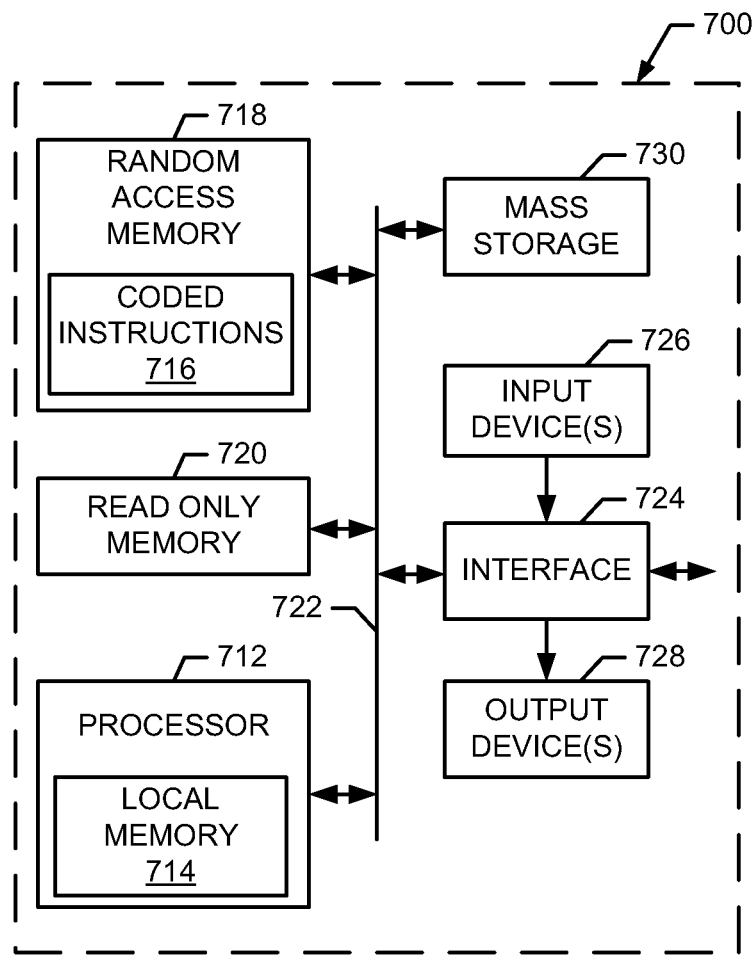
FIG. 8 is a block diagram of an example processing system that may store and execute example machine readable instructions used to implement any, some or all of the processes of FIGS. 4-5 and 7 to implement the mobile station of FIG. 2, the base station subsystem of FIG. 6 or the 3GPP communication system of FIG. 1, or both.

FIG. 8 is a block diagram of an example processing system 700 capable of implementing the apparatus and methods disclosed herein. The processing system 700 can correspond to, for example, a mobile station processing platform, a network element processing platform, a server, a personal computer, a personal digital assistant (PDA), an Internet appliance, a mobile phone, or any other type of computing device.

The system 700 of the instant example includes a processor 712 such as a general purpose programmable processor, an embedded processor, a microcontroller, etc. The processor 712 includes a local memory 714, and executes coded instructions 716 present in the local memory 714 and/or in another memory device. The processor 712 may execute, among other things, machine readable instructions to implement the processes represented in FIGS. 4-5 and 7. The processor 712 may be any type of processing unit, such as one or more microprocessors from the Intel® Centrino® family of microprocessors, the Intel® Pentium® family of microprocessors, the Intel® Itanium® family of microprocessors, and/or the Intel® XScale® family of processors, one or more microcontrollers from the ARM® family of microcontrollers, the PIC® family of microcontrollers, etc. Of course, other processors from other families are also appropriate.

The processor 712 is in communication with a main memory including a volatile memory 718 and a non-volatile memory 720 via a bus 722. The volatile memory 718 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 720 may be implemented by flash memory and/or any other desired type of memory device. Access to the main memory 718, 720 is typically controlled by a memory controller (not shown).

The computer 700 also includes an interface circuit 724. The interface circuit 724 may be implemented by any type of interface standard, such as an Ethernet interface, a universal serial bus (USB), and/or a third generation input/output (3GIO) interface.

One or more input devices 726 are connected to the interface circuit 724. The input device(s) 726 permit a user to enter data and commands into the processor 712. The input device(s) can be implemented by, for example, a keyboard, a mouse, a touchscreen, a track-pad, a trackball, an isopoint and/or a voice recognition system.

One or more output devices 728 are also connected to the interface circuit 724. The output devices 728 can be implemented, for example, by display devices (e.g., a liquid crystal display, a cathode ray tube display (CRT)), by a printer and/or by speakers. The interface circuit 724, thus, typically includes a graphics driver card.

The interface circuit 724 also includes a communication device such as a modem or network interface card to facilitate exchange of data with external computers via a network (e.g., an Ethernet connection, a digital subscriber line (DSL), a telephone line, coaxial cable, a cellular telephone system such as an EGPRS-compliant system, etc.).

The computer 700 also includes one or more mass storage devices 730 for storing software and data. Examples of such mass storage devices 730 include floppy disk drives, hard drive disks, compact disk drives and digital versatile disk (DVD) drives. The mass storage device 730 may store the one or more not allowed cell structures 215A-B. Alternatively, the volatile memory 718 may store the one or more not allowed cell structures 215A-B.

As an alternative to implementing the methods and/or apparatus described herein in a system such as the device of FIG. 8, the methods and or apparatus described herein may be embedded in a structure such as a processor and/or an ASIC (application specific integrated circuit).

Finally, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A cell reselection method comprising:
    obtaining cell information indicating whether signal strength of a first neighbor cell determined by a mobile station to be not allowed for cell reselection is to be considered by the mobile station while evaluating one or more candidate neighbor cells determined to be allowed for cell reselection;
    reselecting to a second neighbor cell different from the first neighbor cell when a second signal strength of the second neighbor cell is less than a first signal strength of the first neighbor cell and the cell information indicates that signal strength of the first neighbor cell is not to be considered during cell reselection; and
    not reselecting to the second neighbor cell when the second signal strength of the second neighbor cell is less than the first signal strength of the first neighbor cell and the cell information indicates that signal strength of the first neighbor cell is to be considered during cell reselection.

2. A cell reselection method comprising:
    obtaining cell information indicating whether signal strength of a first neighbor cell not allowed for cell reselection is to be considered during cell reselection; and
    reselecting to a second neighbor cell different from the first neighbor cell based on the cell information, wherein reselecting to the second neighbor cell different from the first neighbor cell based on the cell information comprises reselecting to the second neighbor cell when a second signal strength of the second neighbor cell is less than a first signal strength of the first neighbor cell and the cell information indicates that signal strength of the first neighbor cell is not to be considered during cell reselection.

3. A method as defined in claim 2 further comprising determining a strongest neighbor cell allowed for cell reselection, wherein the second neighbor cell is the determined strongest neighbor cell allowed for cell reselection.

4. A method as defined in claim 2 wherein the first neighbor cell implements at least one of a universal terrestrial radio access network (UTRAN) or an evolved universal terrestrial radio access network (E-UTRAN), and the first signal strength of the first neighbor cell is based on at least one of a received signal code power (RSCP), a reference symbol received power (RSRP) or a path loss measurement.

5. A method as defined in claim 2 further comprising:
    receiving an indication indicating whether signal strength of the first neighbor cell is to be considered during cell reselection; and
    receiving allowed cell information identifying a set of neighbor cells allowed for cell reselection.

6. A method as defined in claim 2 further comprising:
    receiving an indication indicating whether signal strength of the first neighbor cell is to be considered during cell reselection; and
    receiving not allowed cell information identifying a set of neighbor cells not allowed for cell reselection.

7. A method as defined in claim 2 further comprising determining the cell information based on combining first not allowed cell information decoded from broadcast signaling and second not allowed cell information decoded from dedicated signaling, the first not allowed cell information and the second not allowed cell information each identifying respective sets of neighbor cells not allowed for cell reselection.

8. A method as defined in claim 2 wherein the cell information comprises a data structure, the data structure comprising:
    an identifier to identify one or more neighbor cells not allowed for cell reselection; and
    an indicator to indicate whether signal strength for one or more of the identified neighbor cells is to be considered during cell reselection.

9. A method as defined in claim 2 further comprising receiving an indication from a serving cell indicating whether signal strength of the first neighbor cell is to be considered during cell reselection.

10. A tangible machine readable storage medium comprising machine readable instructions which, when executed, cause a machine to at least:
    obtain cell information indicating whether a first neighbor cell is not allowed for cell reselection and indicating whether signal strength of the first neighbor cell is to be considered during cell reselection; and
    determine whether to reselect to a second neighbor cell different from the first neighbor cell based on the cell information, wherein the machine readable instructions, when executed, further cause the machine to:
    reselect to the second neighbor cell when a second signal strength of the second neighbor cell is less than a first signal strength of the first neighbor cell and the cell information indicates that signal strength of the first neighbor cell is not to be considered during cell reselection; and
    not reselect to the second neighbor cell when the second signal strength of the second neighbor cell is less than the first signal strength of the first neighbor cell and the cell information indicates that signal strength of the first neighbor cell is to be considered during cell reselection.

11. A tangible storage medium as defined in claim 10 wherein the machine readable instructions, when executed, further cause the machine to not reselect to the second neighbor cell when a third signal strength of a third neighbor cell exceeds the second signal strength of the second neighbor cell, the cell information indicates that the third neighbor cell is not allowed for cell reselection, and the cell information further indicates that signal strength of the third neighbor cell is to be considered during cell reselection.

12. A tangible storage medium as defined in claim 10 wherein the machine readable instructions, when executed, further cause the machine to determine the cell information based on combining first not allowed cell information decoded from broadcast signaling and second not allowed cell information decoded from dedicated signaling, the first not allowed cell information and the second not allowed cell information each identifying respective sets of neighbor cells not allowed for cell reselection.

13. A tangible storage medium as defined in claim 10 wherein the machine readable instructions, when executed, further cause the machine to determine the cell information based on combining allowed cell information decoded from at least one of first broadcast signaling or first dedicated signaling and not allowed cell information decoded from at least one of second broadcast signaling or second dedicated signaling, the allowed cell information identifying a first set of neighbor cells allowed for cell reselection, the not allowed cell information identifying a second set of neighbor cells not allowed for cell reselection.

14. A mobile station comprising:
    a first processing element to obtain cell information identifying a set of not allowed neighbor cells each not allowed for cell reselection, the cell information also indicating, for each not allowed neighbor cell, whether signal strength of each not allowed neighbor cell is to be ignored during cell reselection; and a second processing element to determine whether reselection to a candidate neighbor cell is permitted based on the cell information, wherein the second processing element is to determine that reselection to the candidate neighbor cell is permitted when a first not allowed neighbor cell is stronger than the candidate neighbor cell and the cell information indicates that signal strength of the first not allowed neighbor cell is to be ignored during cell reselection, and that reselection to the candidate neighbor cell is not permitted when the first not allowed neighbor cell is stronger than the candidate neighbor cell and the cell information indicates that signal strength of the first not allowed neighbor cell is not to be ignored during cell reselection.

15. A mobile station as defined in claim 14 wherein the second processing element is to further determine that reselection to the candidate neighbor cell is permitted when the candidate neighbor cell is stronger than each not allowed neighbor cell whose signal strength is not to be ignored during cell reselection, but is not permitted when the candidate neighbor cell is not stronger than any not allowed neighbor cell whose signal strength is not to be ignored during cell reselection.

16. A mobile station as defined in claim 14 wherein the first processing element is to:
  receive a set of indications indicating whether signal strength of each not allowed neighbor cell is to be ignored during cell reselection; and
  receive allowed cell information identifying a set of neighbor cells allowed for cell reselection.

17. A mobile station as defined in claim 14 wherein the first processing element is to:
  receive a set of indications indicating whether signal strength of each not allowed neighbor cell is to be ignored during cell reselection; and
  receive not allowed cell information identifying the set of not allowed neighbor cells.

18. A mobile station as defined in claim 14 wherein the first processing element is to determine the cell information based on combining first not allowed cell information decoded from broadcast signaling and second not allowed cell information decoded from dedicated signaling, the first not allowed cell information and the second not allowed cell information each identifying respective sets of not allowed neighbor cells.

* * * * *